Oct. 25, 1955    S. M. MOREY ET AL    2,721,487
PLANETARY GEARING DRIVE SYSTEMS
Filed Nov. 13, 1952    8 Sheets-Sheet 1

FIG. 1

INVENTORS
Sigmund M. Morey
BY Secondo L. Casella
ATTORNEY

Oct. 25, 1955    S. M. MOREY ET AL    2,721,487
PLANETARY GEARING DRIVE SYSTEMS
Filed Nov. 13, 1952    8 Sheets-Sheet 2

INVENTORS
*Sigmund M. Morey*
BY *Secondo L. Casella*
ATTORNEY

Oct. 25, 1955    S. M. MOREY ET AL    2,721,487
PLANETARY GEARING DRIVE SYSTEMS
Filed Nov. 13, 1952    8 Sheets-Sheet 3

INVENTORS
*Sigmund M. Morey*
BY *Secondo L. Casella*
*J. B. Felshin*
ATTORNEY

Oct. 25, 1955  S. M. MOREY ET AL  2,721,487
PLANETARY GEARING DRIVE SYSTEMS
Filed Nov. 13, 1952  8 Sheets-Sheet 4

INVENTORS
*Sigmund M. Morey*
BY *Secondo L. Casella*
*J. B. Felshin*
ATTORNEY

Oct. 25, 1955 S. M. MOREY ET AL 2,721,487
PLANETARY GEARING DRIVE SYSTEMS
Filed Nov. 13, 1952 8 Sheets-Sheet 5

INVENTORS
Sigmund M. Morey
BY Secondo L. Casella
ATTORNEY

United States Patent Office 2,721,487
Patented Oct. 25, 1955

2,721,487

PLANETARY GEARING DRIVE SYSTEMS

Sigmund M. Morey and Secondo L. Casella, New York, N. Y., assignors to Morey Machinery Co., Inc., Astoria, N. Y., a corporation of New York Application November 13, 1952, Serial No. 320,324

24 Claims. (Cl. 74—765)

This invention relates to planetary gearing drive systems. It is particularly directed to a planetary gearing system for a lathe spindle or for other shafts to be driven at different speeds.

An object of this invention is to provide a system of the character described, comprising a pair of planetary gearing trains, a pair of brakes, and a pair of clutches, and means to control the two brakes and the two clutches for driving a spindle or shaft either at high speed, medium speed, low speed, reverse, or to stop the rotation of the spindle or shaft, or to release the spindle or shaft so that it can be turned by hand. In each of the high, medium, low, and reverse positions any usual means may be provided to vary the speed between predetermined ranges.

Another object of this invention is to provide a system of the character described, in which the planetary carriers of the two planetary gear trains run loose on the spindle and are connected thereto by clutches.

Still a further object of this invention is to provide in a system of the character described, means to actuate the two brakes and the two clutches hydraulically.

Yet a further object of this invention is to provide a system of the character described in which both clutches include clutch means splined to the spindle and highly improved means to actuate the clutches.

Still a further object of this invention is to provide in a system of the character described, five manually actuated members, and means so arranged that when one member is actuated all the other members are released, the arrangement being such furthermore, that when one member is activated, the system is set for stopping or braking the spindle; upon actuating another member, the system goes into operation at high speed; upon actuating a third member, the system goes into medium speed range; upon actuating a fourth member, the system goes into low speed; and upon actuating a fifth member, the system goes automatically into reverse drive. The arrangement is such furthermore that if all of the plungers are released, the entire system is idle so that the spindle or shaft can be rotated by hand.

Still a further object of this invention is to provide a planetary drive system of the character described comprising a first brake and a second brake, and a first clutch and a second clutch, the arrangement being such that upon actuating the first manual member, the first brake and the first clutch are concurrently actuated and the second brake and the second clutch are released, to stop the operation of the shaft or spindle; when the second manual member is operated, the first clutch and the second clutch are concurrently actuated, and the two brakes are released automatically, for turning the shaft or spindle in the high speed range; when the third member is actuated the first clutch and the second brake are concurrently actuated and the first brake and the second clutch are released to rotate the shaft or spindle at a medium speed range; when the fourth member is actuated the second clutch and the second brake are concurrently actuated and the first clutch and first brake are released for rotating the shaft or spindle at low speed range; when the fifth member is actuated or pushed in, the second clutch and the first brake are concurrently actuated and the first clutch and the second brake are released, for driving the spindle in a reverse direction; and when all the members are released, both brakes and clutches are released, so that the shaft or spindle may be turned by hand.

Yet a further object of this invention is to provide a planetary gearing drive for a shaft or spindle, including a plurality of planetary gearing trains, a plurality of brakes for different portions of said gear trains, and a plurality of clutches for clutching portions of said gear train to the spindle, a plurality of manually or actuated members, the arrangement being such that when any of said manual members are actuated, a plurality of said brakes and/or clutches are actuated for controlling the drive shaft or spindle.

Yet a further object of this invention is to provide in a planetary gearing system of the character described, a pair of planetary gear trains, a pair of similar symmetrically disposed members attached together, and each including a ring gear for one of the planetary gear trains, and means to brake said united members.

Still a further object of this invention is to provide in a drive system of the character described, a shaft or spindle, a planetary gear train, clutch means to clutch an element of the gear train to the shaft or spindle, hydraulic means to actuate the clutch including a ring piston surronuding the shaft or spindle and spaced from the clutch, and a plurality of rods parallel to the axis of the shaft or spindle and surrounding the same and so arranged that movement of the ring piston will move said rods to actuate the clutch, said planetary gearing including an element formed with openings through which said rods pass.

Yet a further object of this invention is to provide a highly improved planetary gearing system for driving a spindle or shaft, which shall be relatively inexpensive to manufacture, sure and positive in operation, and practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention.

Referring now to the drawing, 10 designates a machine or system embodying the invention, here shown for the purpose of illustration as a head stock for a lathe, it being understood that the invention may be embodied in any other suitable machine or any system for driving a shaft or spindle. The machine 10 comprises a headstock casing 11, having a front wall 12, a rear wall 13, and a bottom wall 14. The headstock may be open at the top as at 15, and the open top of the headstock casing may be closed by a cover 16 suitable bolted as by bolts 17 to flanges 18 at the top of the headstock casing.

The casing 11 is provided with a transverse wall 19 the latter being formed with an annular boss 20 having a central annular through opening 21. Said casing is formed with another transverse wall 22 spaced from wall 19 and formed with an annular boss 23 having a central opening 24 coaxial with but larger than the opening 21. Within the opening 20 are a pair of similar symmetrically disposed bearings 25, each comprising an outer race 26 fixed within a boss 20, a rotary race 27, and tapered inclined rollers 28 between said races.

Extending through and fixed to the rotary races 27 is a sleeve drive shaft 29. The drive shaft passes through the opening 21 and projects therefrom in opposite directions. Mounted on one end of the drive shaft 29 is a pulley 30 which may be connected to any suitable motor drive by usual belting (not shown). The opposite end of the drive shaft 29 projects into the chamber 31 formed between the transverse walls 19 and 22, and it is formed with an integral sun gear 32, for the purpose hereinafter appearing. Any suitable means may be provided to prevent longitudinal movement of the drive shaft 29. Furthermore, the drive pulley 30 may be keyed to the drive shaft as by keys 30a and it may be retained on the drive shaft and pressed against the movable race 27 of the adjacent bearing by a nut 34 screwed onto a threaded portion 35 of the drive shaft.

Fixed to the portion of the flange or hub 20 which projects into the chamber 31 is an annular member 36 formed at one face with an annular piston groove 37 in which is fitted an annular piston ring 38. Between the piston ring 38 and the bottom of the groove 37 is formed an annular piston chamber 39 adapted to receive a hydraulic medium fed thereto through a tube 40 screwed within an opening 41 in member 36. Member 36 encloses one of the bearings 25. A suitable apron 42 may be fixed to the opposite end of the flange or hub 20 to enclose the other bearing 25.

Extending through the drive shaft 29 and through the headstock casing 11, is a hollow spindle 43 which constitutes the driver shaft. The spindle 43 may be of any suitable construction, and is rotatably mounted within the headstock.

Surrounding the spindle 43 and mounted thereon for rotation relative thereto, by means of a pair of ball bearings 44 and 45, is a planetary pinion carrier 46. Said carrier 46 comprises two parts, one part designated by the numeral 47 and another part designated by the numeral 48. These parts are attached together by bolts 49. The part 47 comprises annular walls 50 and 51 interconnected by part circular web portions 52. The walls 50 and 51 are interconnected by a plurality of equiangularly spaced shafts 53 parallel to the axis of the spindle and carrying bushings 55 journalled in suitable openings in said walls. Each shaft 53 carries a planet pinion 56 meshing with the sun gear 32. Planet pinions 56 are all similar and are equi-angularly spaced apart and pass through openings between the walls 52.

Extending from wall 50 is an annular flange 57 projecting towards member 36.

Within flange 57 is an annular ring 58 contacting the inner surface of flange 57. Surrounding the drive shaft 29 and in alignment with the ring 58 is an annular ring 59 formed with a plurality of notches 60. Within each notch is a roller thrust bearing member 61. The axes of members 61 are radial and said members project to opposite sides of ring 59. Rings 58 and 59 constitute a cake for the thrust bearing member 61. Surrounding the drive shaft 29 and between rings 58, 59 and wall 50, is an annular disk 62. The roller thrust bearings 61 are interposed between piston ring 38 and the disk 62. Thus, when hydraulic medium passes from tube 40 into chamber 39 under pressure, ring piston 38 will move to the right, looking at Fig. 1, to press against thrust bearing 61, which in turn will move the disk 62 to the right, for the purpose hereinafter appearing.

Carrier member 48 comprises an annular cylindrical wall 63 concentric with the cylinder. Extending from wall 63 is an annular shoulder 64 from which extends a cylindrical sleeve 65 surrounding the spindle 43 and formed at its outer surface with a sun gear 66. Between wall 51 and shoulder 64 and surrounding the spindle is a disk clutch 67 comprising a plurality of disks 68 keyed to the spindle and alternating with disks 69 keyed to cylindrical wall 63. The ball bearing 45 is interposed between the end member 70 of clutch 67 which is keyed to the spindle and sleeve 63. An opposite end clutch member 71 is keyed to the flange 63.

Figure 6:
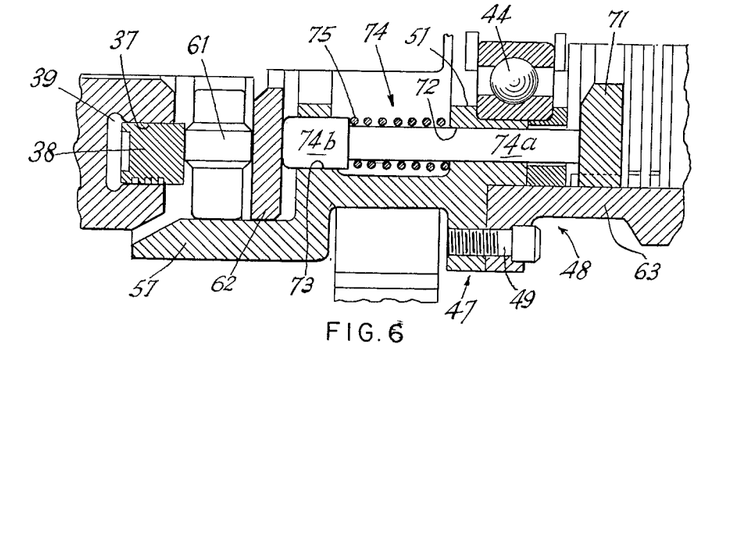
Fig. 6 is an enlarged cross sectional detail view illustrating the actuating means for one of the clutches.
Figure 7:
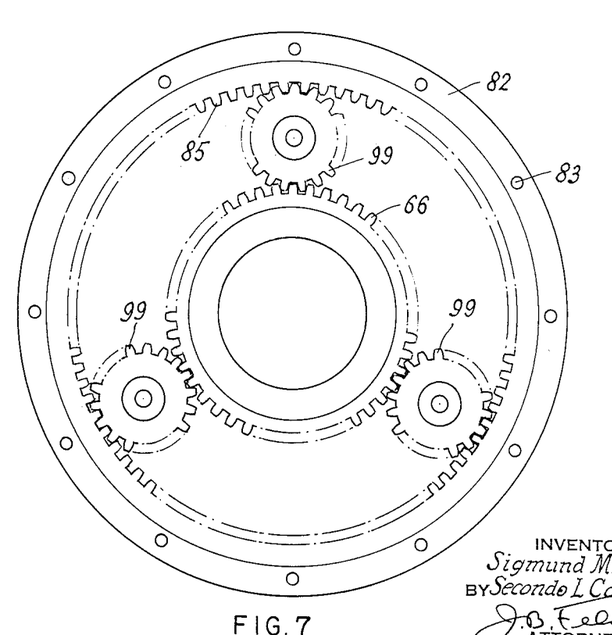
Fig. 7 is a cross sectional view taken on the line 7—7 of Fig. 1.
Figure 8:
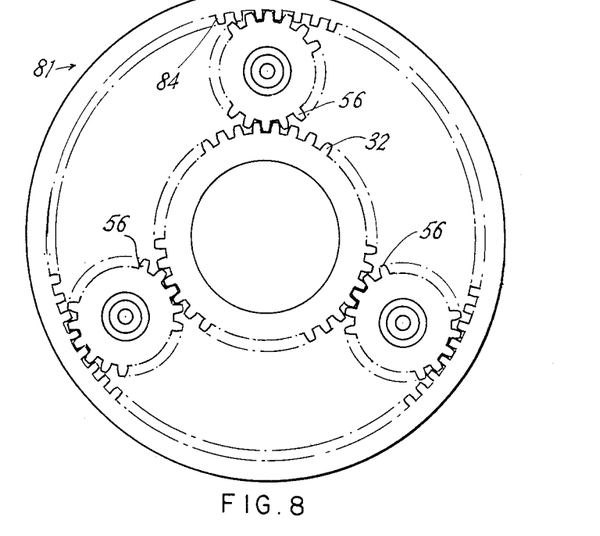
Fig. 8 is a cross sectional view taken on the line 8—8 of Fig. 1.

Wall 51 of carrier part 47 is formed with a plurality of through openings 72 (see Fig. 6) equiangularly spaced apart and parallel to the axis of the spindle. Wall 50 is formed with a plurality of openings 73 aligned with the openings 72 but of larger diameter. Slidably mounted in each pair of aligned openings 72, 73 is a thrust pin 74 having a shank portion 74a passing through opening 72 and head portion 74b passing through opening 73. Interposed between head portion 74b and wall 51 of each pin is a coil compression spring 75. Pins 74 are parallel to the axis of the spindle and equidistant therefrom.

It will now be understood that when hydraulic medium under pressure enters the chamber 39, plate 62 will be moved to the right, causing thrust pins 74 to press against the end member 71 of the clutch to apply the clutch for clutching carrier 46 to the spindle for rotation therewith. When pressure is relieved in chamber 39, springs 75 will retract the pins 74 and release the clutch. It will now be noted that there will be no rubbing between pin 74 and plate 71 because both rotate with the carrier.

Surrounding the carrier 46 is a ring gear member 80 comprising a pair of similar symmetrically disposed parts 81 having contacting flanges 82 bolted together by bolts 83. One member 81 carries a ring gear 84 meshing with the planet pinions 56. The other member 81 carries ring gear 85, for the purpose hereinafter appearing. Interposed between sleeve 63 of member 48 and member 80 is a ball bearing 86 so that member 80 can rotate freely relative to the carrier.

Surrounding the spindle and passing through the opening 24 in transverse wall 22 is a second planet carrier 90. Carrier 90 comprises a cylindrical sleeve portion 91. Interposed between sleeve portion 91 and the spindle 43 are a pair of roller bearings 92. Extending from cylindrical wall 91 and disposed within the chamber 31 is an annular rim flange 93. Extending therefrom is a cylindrical wall 94 formed with a plurality of openings. Extending from wall 94 is a second annular rim flange 95. Flanges 93, 95 are disposed on opposite sides of the sun gear 66. Said flanges 93, 95 are formed with through openings supporting a plurality of parallel equiangular spaced bushings 97. Within each bushing 97 is a shaft 98 supporting a planet pinion 99. Planet pinions 99 mesh with the sun gear 66 and with the ring gear 85. Said planet pinions are equiangularly spaced apart.

Keyed to the spindle 43 and disposed on the outer side of transverse wall 22 is a clutch casing 100 surrounding one end of cylindrical wall 91 of the carrier 90. Interposed between cylindrical wall 91 and cylindrical flange 101 on housing 100 is a clutch 102. The clutch 102 comprises clutch disks keyed to the cylindrical flange 91 and clutch disks keyed to the flange 101. At opposite sides of the disks 102 are end members 103 and 104. Fixed within the opening 24 of transverse wall 22 is a ring 105 formed with an annular groove 106 in which is received a piston ring 107. Between the piston ring 107 and the bottom of the groove is formed a piston chamber 108. Member 105 is formed with a passage 110 communicating with the annular chamber 108. Member 105 is formed with an annular flange 112 projecting toward the flange 101. Received therein is a bronze ring 113. Surrounding flange 90 is a bronze ring 114 formed with a plurality of spaced notches receiving thrust bearing rollers 115 projecting to opposite sides of said ring. The axes of rollers 115 are radial and said rollers are interposed between and may contact piston ring 112 and end plate 104 of clutch 102.

Figure 1:
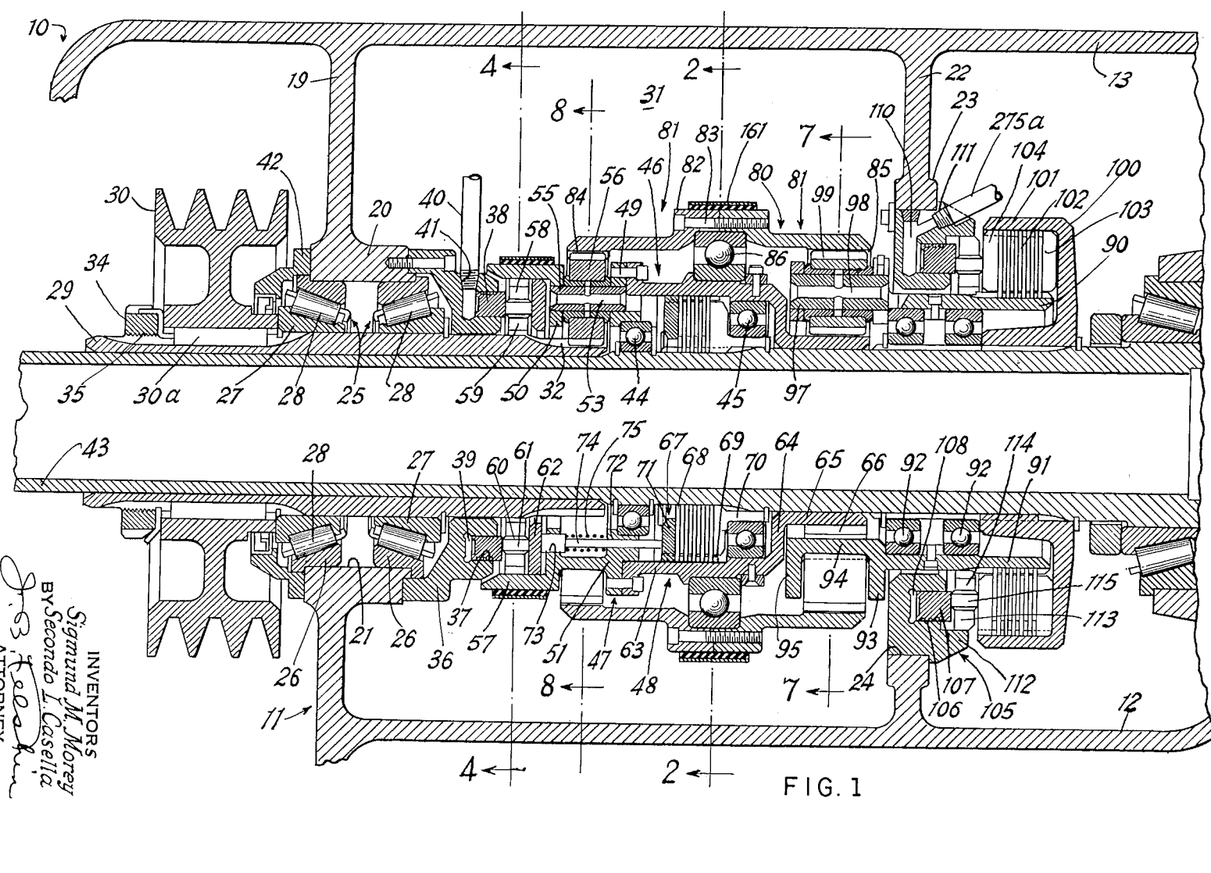
Fig. 1 is a horizontal cross sectional view through the axis of the spindle and illustrating the planetary gearing system embodying the invention.

It will now be understood that when hydraulic medium under pressure is supplied to passage 110 and 108, piston 107 will move to the right, looking at Fig. 1, to press the rollers 115, to press plate 104, to apply the clutch 102 and to thereby connect the carrier 90 to the spindle for rotation therewith. When pressure is relieved, the clutch is released, so that the carrier 90 and the spindle 43 may have movement independent of each other.

It will now be understood that the transmission system comprises a first planet gear train and a second planet gear. The carrier 46 for the first planet gear train carries the sun gear for the second planet gear train. The ring gear for both planet gear trains is the common member 81. Also, there are two clutches, one interposed between planet carrier for the first gear train and the spindle, and the other interposed between the planet carrier for the second gear train and the spindle. It will also now be understood that there is means to actuate each of the clutches.

Figure 4:
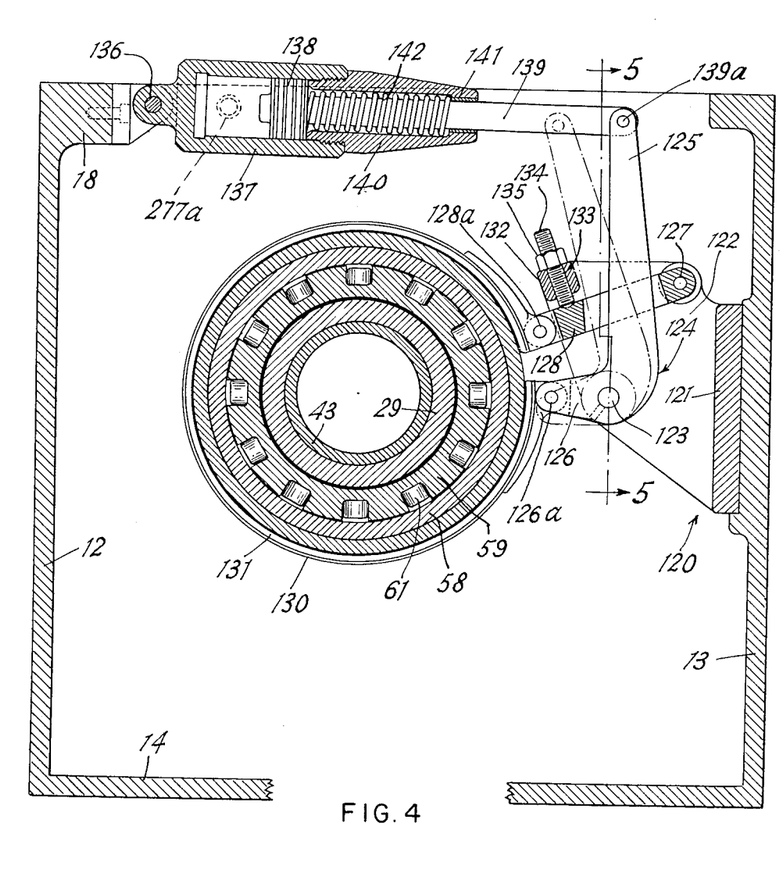
Fig. 4 is a cross sectional view taken on the line 4—4 of Fig. 1.
Figure 5:
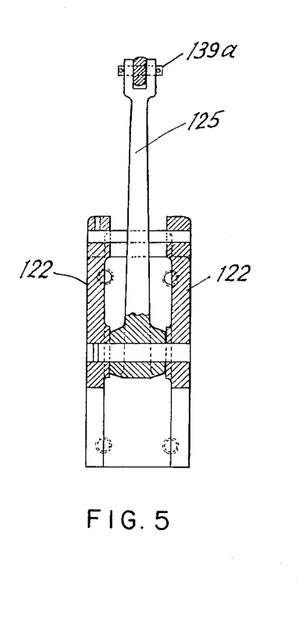
Fig. 5 is a cross sectional view taken on the line 5—5 of Fig. 4.

Means is further provided to brake the planet carrier 46. Referring now to Figs. 1, 4 and 5, there is attached to the rear wall 13 a bracket 120. The same comprises a rear wall 121 fixed to the rear wall 13 of the headstock casing, and a pair of forwardly projecting parallel flanges 122. Walls 122 carry a transverse pin 123 on which is pivoted a bell crank 124, having an upwardly extending arm 125 and forwardly extending arm 126. Also carried on and between flanges 122 and disposed above and in the rear of the pin 123 is a pin 127. Pivoted to the pin 127 is a link 128. Interconnecting the forward end of link 128 and the forward end of arm 126 as by means of pins 128a and 126a is a split brake band 130 to the inside of which is attached a brake lining 131. The brake lining 131 surrounds flange 57. The front upper ends of flanges 122 are interconnected by a transverse portion 132 formed with a screw threaded through opening 133. Screwed therethrough is a screw 134 adapted to contact the front end of the link or shackle 128. On screw 134 is a lock nut 135 contacting portion 132. It will now be understood that the brake shoe 130 may be tightened or loosened by the screw 134.

Pivoted to the flange 18 which extends from the upper end of front wall 12 as on pivot pin 136 is a cylinder 137. Within cylinder 137 is a piston 138 connected by a piston rod 139 to the upper end of arm 125 by means of a pivot pin 139a. Fixed to the open end of the cylinder 137 is a closure member 40 provided with a bushing 141 through which the piston rod 139 passes.

Interposed between the end of cover 140 and piston 138 and surrounding piston rod 139 is a spring 142. Any suitable inlet may be provided for the cylinder 137 communicating with tube 277a (to be described hereinafter). When hydraulic medium is applied under pressure to the cylinder, the piston 138 is moved to the right causing pivotal movement of the bell crank 124 about the pin 123 for contracting the brake shoe and applying a braking action to flange 57 of the planet carrier 46. When pressure is relieved within the cylinder 137, the spring 142 releases the brake.

Figure 2:
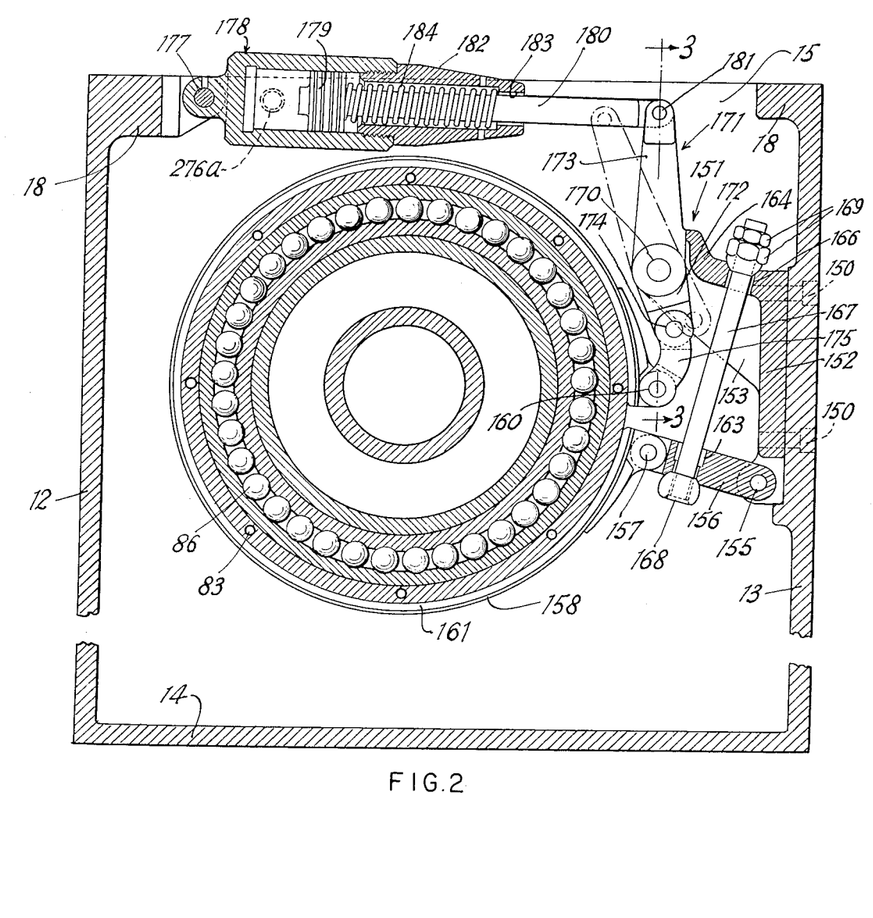
Fig. 2 is a cross sectional view taken on the line 2—2 of Fig. 1.
Figure 3:
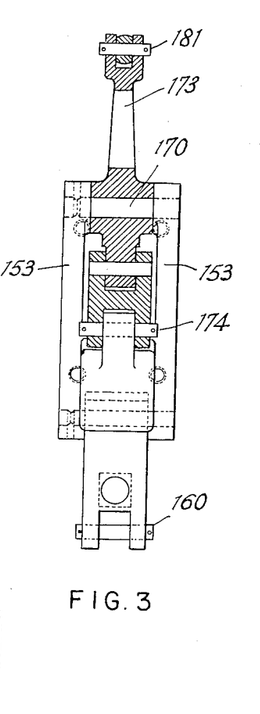
Fig. 3 is a cross sectional view taken on the line 3—3 of Fig. 2.

Referring to Figs. 1, 2 and 3, there is illustrated means for braking the ring gear member 81. To this end there is fixed as by bolts 150 to the rear wall 13, a bracket 151 having a rear wall 152 from which extend forwardly flanges 153. Carried by the lower end of wall 150 is a pivot pin 155. Pivoted thereto is the rear end of a link 156. Said link is pivoted at its forward end as by pivot pin 157 to one end of a brake band 158. The other end of the brake band 158 carries a pivot pin 160, for the purpose hereinafter appearing.

Attached to the inside of the brake band 158 is a brake lining or brake shoe 161. Link 156 is formed with a through opening 163, for the purpose hereinafter appearing. Extending from the rear wall 152 of the bracket 151 is a top wall 164 formed with a through opening 166. Extending through the openings 166 is a tie rod 167 having a head 168 at its lower end contacting the underside of link 156. Screwed to the upper end of tie rod 167 are lock nuts 169 contacting the fixed wall 164 of the bracket. It will now be understood that the tie rod 167 limits downwardly swinging movement of link 156.

Carried on and between side walls or flanges 153 of the bracket 151 is a transverse pivot pin 170. Pivoted thereto is a lever 171. Lever 171 has a downwardly extending arm 172 and an upwardly extending arm 173. Carried by the lower end of the downwardly extending arm 172 is a pivot pin 174. Interconnecting the pivot pins 160 and 174 is a link 175. Carried by the flange 18 which extends from the upper end of wall 12 is a pivot pin 177. Pivoted thereto is a cylinder 178. Slidable within the cylinder 178 is a piston 179. Attached to the piston 179 is a piston rod 180 connected by pin 181 to the upper end of arm 173. Screwed to the front end of the cylinder 178 is a cover 182 provided with a bushing 183 at its forward end through which the piston rod 180 passes. Surrounding the piston rod and interposed between one end of the cover 182 and the piston 179 is a coil compression spring 184.

It will now be understood that cylinder 187 is provided with suitable inlet connected to tube 276a (to be described later) through which hydraulic medium under pressure may be supplied to the cylinder for moving the piston 179 to the rod, looking at Fig. 2. Such movement will cause clockwise rotation of the lever 171 to thereby cause the link 175 to press downwardly for contracting the brake shoe. The brake shoe 157 surrounds the meeting flanges of the ring gear member 81, as shown in Fig. 1 of the drawing. When hydraulic medium under pressure is supplied to the cylinder 178, the brake is applied to the ring gear member 81 to stop its rotation.

It will now be understood that when the clutch 67 and the brake 131 are applied, rotation of the spindle will be stopped. This is true because the clutch 67 when actuated connects the spindle to the carrier 46 and the application of the brake 131 will stop rotation of said carrier.

To obtain high speed range, the two clutches 67 and 102 are actuated, thereby causing carriers 46, 90, ring gear 81, spindle 43, and drive shaft 29 to rotate together as a unit at the same speed thus providing a one to one ratio between the angular velocities of drive shaft 29 and spindle 43.

To achieve medium speed, clutch 67 and brake 161 are actuated. Ring gear 81 will thus be stationary and the decrease in speed will be achieved through the drive shaft 29 through sun gear 32 and the carrier 46. To achieve low speed, clutch 102 and brake 161 are actuated. The drive now is through drive shaft 29, planet pinions 56, achieving one decrease of speed and through carrier 46, sun gear 66, planet pinions 99 and carrier 90 to the spindle to achieve another increase in speed. To reverse the direction of rotation of the spindle, clutch 102 and brake 131 are actuated. Now the carrier 46 is stationary and rotation of the drive shaft in one direction will cause rotation of the ring gear 81 in an opposite direction, and said direction of rotation is passed on to the carrier 90 and hence to the spindle.

It if is desired to have the spindle loose, then both clutches and both brakes are released. Since the spindle is not clutched to anything, the spindle will be idle and can be turned by hand.

Means is provided to actuate the clutch 67 and brake 131 concurrently for stopping the spindle by the actuation of one manual member, such as a push button; for actuating clutches 67 and 102 concurrently to achieve "high speed" upon actuation of a second manual member such as a push button; for actuating clutch 67 and brake 161 concurrently to achieve "medium speed" upon actuating a third manual member such as a push button; for actuating clutch 102 and brake 161 concurrently to achieve "low speed" range for the spindle upon actuation of a fourth manual member such as a push button; for actuating clutch 102 and brake 131 concurrently to achieve "reverse" rotation upon actuation of a fifth manual member such as a push button. The invention further includes means to permit the spindle to be loose when all five manual members are released. As will be seen hereinafter, the means referred to also includes means to release the last pushed in button or actuated member actuating another push button or manual member and also it includes means to prevent simultaneous or concurrent actuation of more than one push button or manual member.

To this end there is attached to the front wall 12, a box 200. The same comprises a case 201. Said case 201 comprises parallel vertical side walls 202, 203 and a bottom wall 204. Walls 202, 203 are interconnected by a transverse vertical wall 205. The transverse or partition wall 205 divides the case 200 into a rear compartment 206 and a front compartment 207. The walls 202 and 203 and the bottom wall 205 have rear edges 203a. Walls 203 have front edges 208. Extending from the partition 205 forwardly and on a side adjacent wall 202, is a thickened portion or block 209 having a front face 210 in the plane of edge 208. The block 209 is formed with five horizontal cylindrical bores 211 extending to the outer surface 212 of wall 202. Said block and wall 205 are formed with a pair of horizontal openings 213 and 214 communicating with each bore 211. Said block is furthermore formed with a vertical through opening 215 communicating with all the openings 213. Said block is also formed with pipe threaded openings 218 aligned with the openings 213 and communicating with the vertical through opening 215. The opening 215 may be drilled all the way through the block and the upper and lower ends thereof may be plugged as at 215a. All of the openings 218 are plugged by plugs 219, except one.

On the front face 205a of wall 205 are formed a plurality of horizontal projections 220 each provided with a horizontal slot 221. Each projection 220 is aligned with one of the bores 211. Overlying the front of the case 200 is a thin metal plate 223 attached thereto in any suitable manner. Overlying the plate 223 is a front cover plate 224 having a recess 225 at its inner side. Extending from wall 203 is a lug 227 located adjacent the upper end of the case. Extending from the bottom wall 204 are a pair of lugs 228 and 229 on which are mounted sprocket wheels 228a and 229a. Extending from wall 203 and disposed above bottom wall 205 is a lug 230 formed with horizontal opening 230a. Inserted into said opening 230a is a shank 230b from which extends split nut 230c having a split threaded opening 230d. Screwed into said opening 230d is an externally threaded sleeve 231 held in adjusted position by lock nut 232 screwed thereto and contacting the top surface of the split nut 230c. Extending through the screw 231 is a sprocket chain 233 extending around sprocket wheels 228a and 229a and having one end connected to the lug 227 as at 235. The opposite end of the sprocket chain 233 is connected at one end 236 to one end 237 of a coil tension spring 238. The other end of the coil tension spring 238 is connected as at 239 to an abutment 240 on lug 227. The coil tension spring 238 normally tends to draw up on the end 236 of the sprocket chain 233, for the purpose hereinafter appearing.

Extending from the face 209a of block 209 and disposed between the lugs 220 are parallel horizontal lugs 245. There is also another lug 245 between the uppermost lug 220 and the top of the case. The lugs 220 extend beyond lugs 245. Each lug 245 is formed at its upper end with an opening 246. Inserted in each opening 246 is an upstanding pin 247. Carried on each pin 247 is a sprocket wheel 248. Thus there are five sprocket wheels 248 and they are all on a fixed pin. All the sprocket wheels 248 are in alignment with one another.

Figure 12:
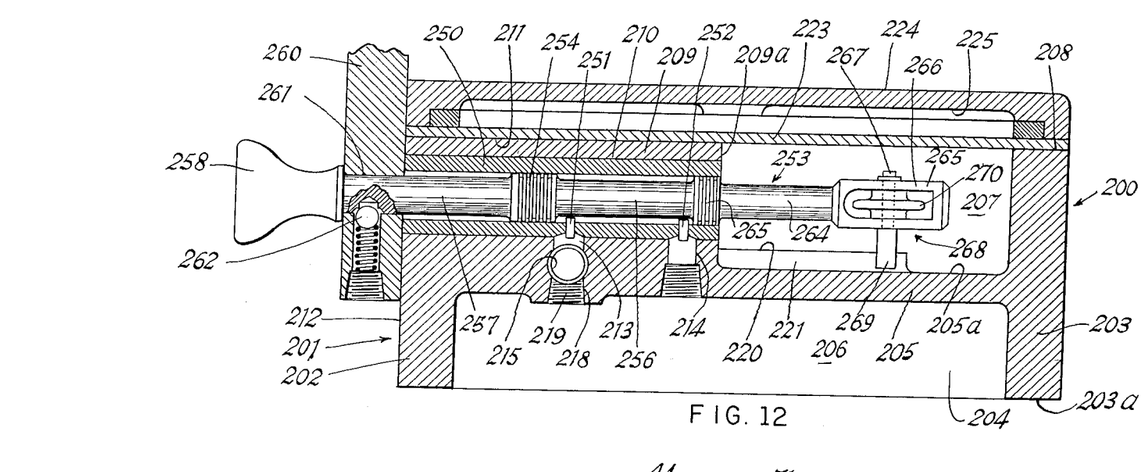
Fig. 12 is a cross sectional view taken on the line 12—12 of Fig. 10.

Disposed within each bore 211 is a bushing 250. Each bushing 250 extends from face 212 of wall 202 to surface 209a of block 209. Each bushing 250 is formed with a pair of transverse slots 251 and 252. The slots 251 establish communication between openings 213 and the interior of the bushings. The slots 252 establish communication between openings 214 and the interior of the bushing. Slidable through each bushing 250 is a piston 253. Each piston 253 comprises a pair of spaced piston heads 254 and 255 interconnected by a reduced axial shank portion 256. When the piston 253 is in the position shown in Fig. 12, both slots 251 and 252 communicate with the chamber or space between piston heads. Extending from piston head 254 is an axial shank portion 257 to the outer end of which is attached to a push button or handle 258.

Attached to surface 212 of wall 202 is a vertical plate 260 formed with through openings 261 through which the shank portions 257 slidably pass. Spring pressed balls 262 carried in plate 260 serve to releasably retain the pistons 253 in a position shown in Fig. 12 where the push button 258 is pushed inwardly. In such position the piston is in actuated condition.

Figure 9:
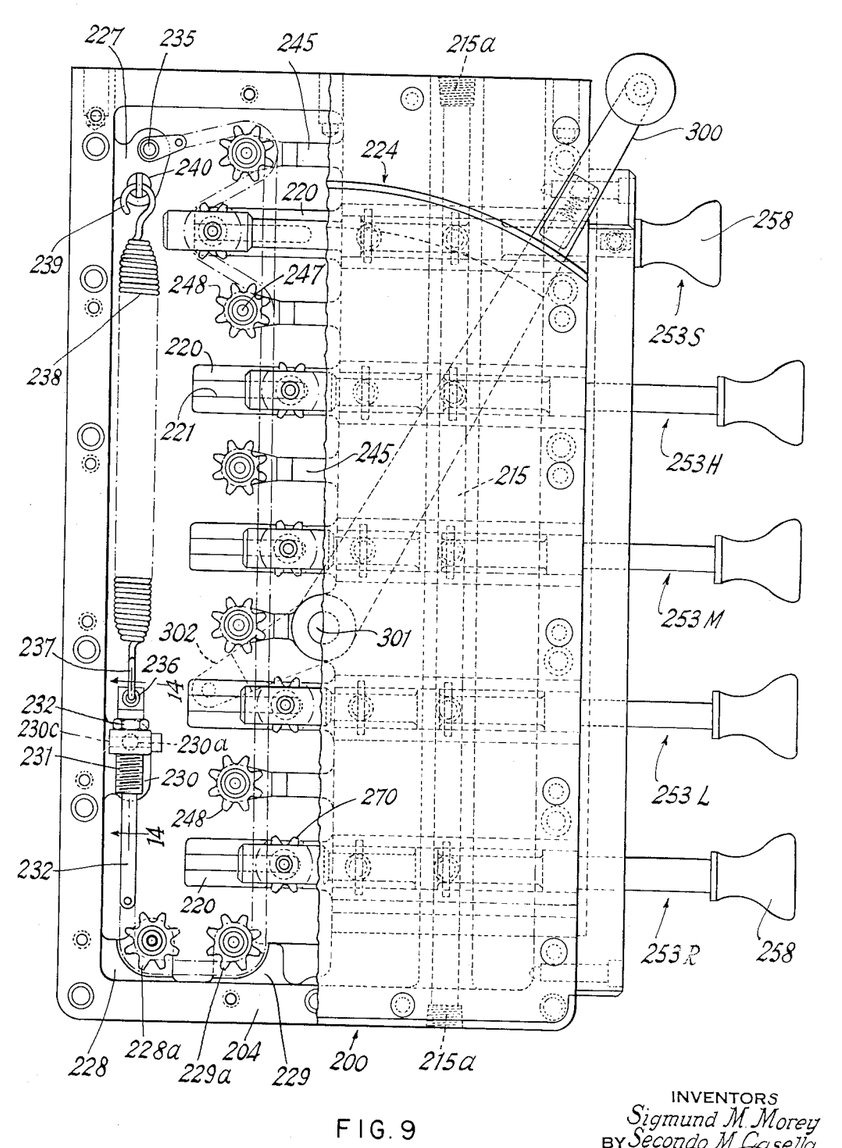
Fig. 9 is a front elevational view of the box carrying the actuating plungers for controlling the drive of the spindle, with parts broken away to show the interior construction.
Figure 10:
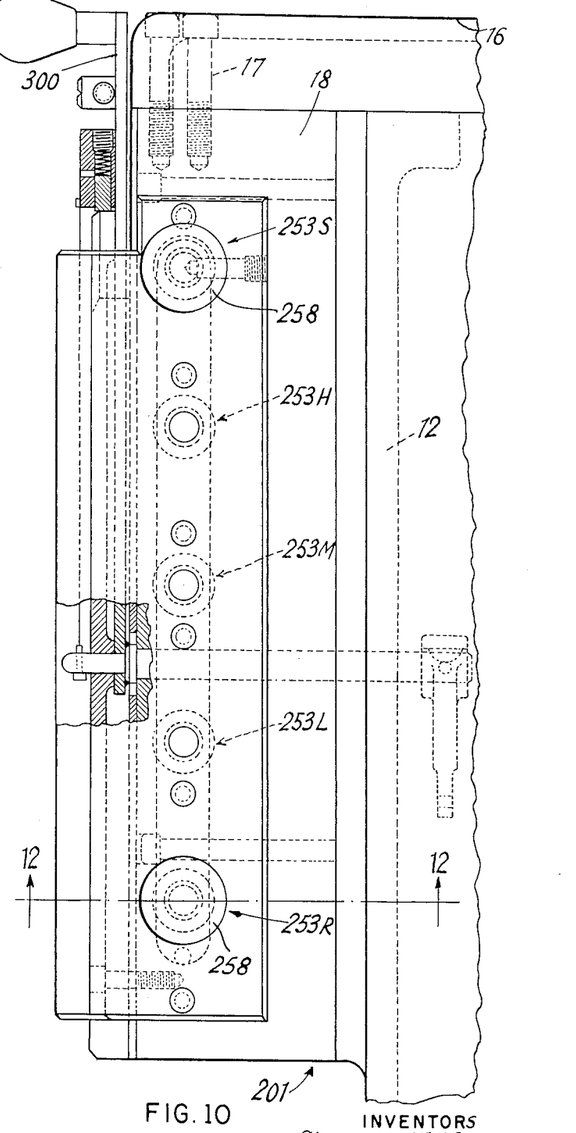
Fig. 10 is a side elevational view of the head stock of the lathe showing one side of the box of Fig. 9 and with parts broken away and in cross section.
Figure 11:
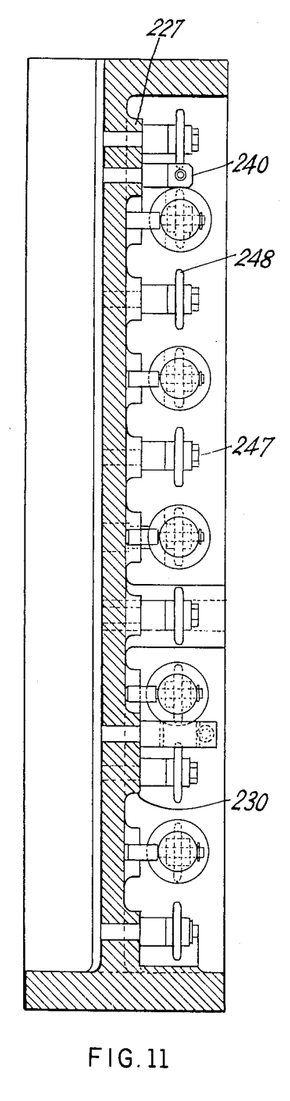
Fig. 11 is a vertical cross sectional view through a portion of the box.

Extending from the piston head 255 is a shank portion 264 from which extends a yoke 265 having top and bottom walls 266 formed with registering openings in which is mounted the upper shank end 267 of a pin 268. Pin 268 has a lower end 269 which projects down into one of the guide slots 22. Received on each shank portion 267 and between the top and bottom walls 266 formed with registering openings in which is mounted the upper shank end 267 of a pin 268. Pin 268 has a lower end 269 which projects down into one of the guide slots 22. Received on each shank portion 267 and between the top and bottom walls 266 of the yoke portion 265 is a sprocket wheel 270. It will be noted that the sprocket chain 233 passes around the left sides of the sprocket wheels 270 and around the right sides of the sprocket wheels 248. Thus sprocket chain alternates around the sprocket wheel 270 and 248. When one push button 258 is pushed in, as, for example, the top push button shown in Fig. 9, all slack in the sprocket chain 233 is taken up because in such position the connecting end 236 of the sprocket chain will substantially strike the lock nut 232. If another push button 258 is pushed in, the last one that had been pushed in will be forced out, so that only one piston at a time can be actuated and the actuation of a piston releases the last actuated piston.

Figure 13:
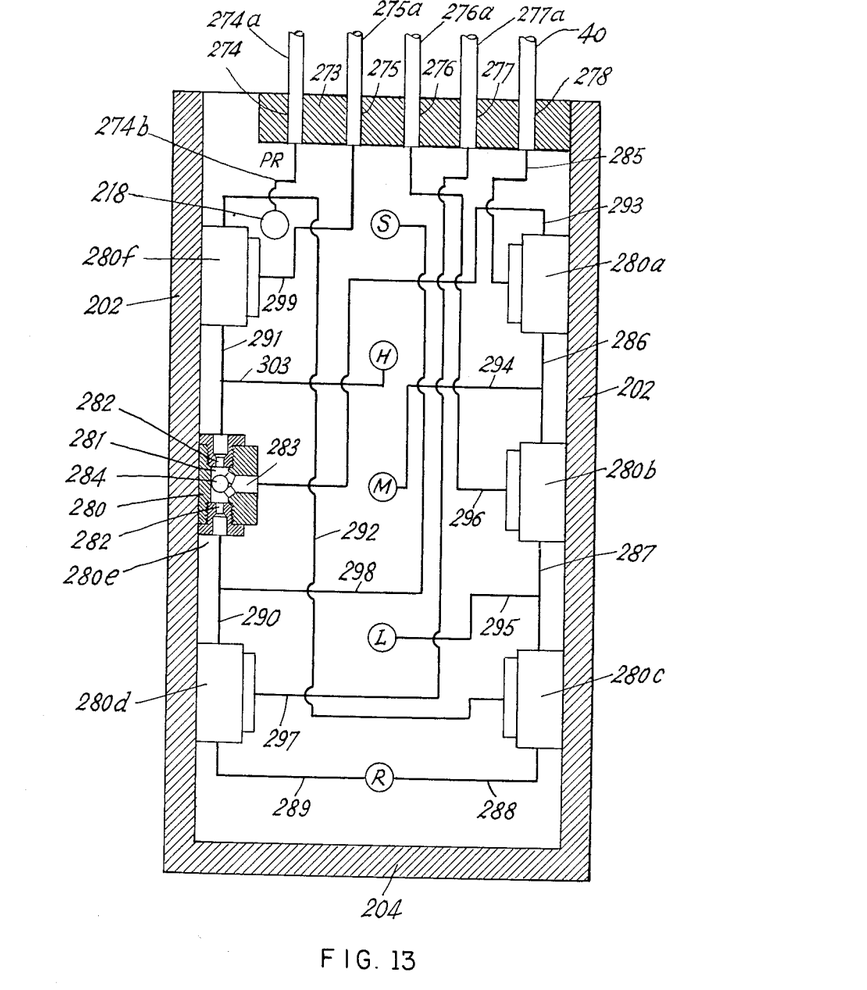
Fig. 13 is a diagrammatic view showing the oil distribution system controlled by the plungers.
Figure 14:
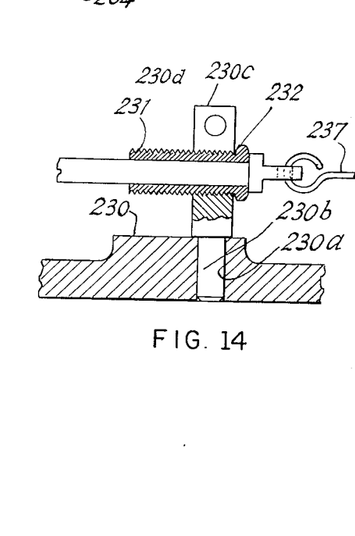
Fig. 14 is a cross sectional view taken on the line 14—14 of Fig. 9.

Attached to the inner surface of partition wall 205 adjacent the top of the casing is a block 273 formed with five through openings indicated by the numerals 274, 275, 276, 277 and 278, respectively. Connected to openings 274 is a tube 274a which is connected to any suitable supply of hydraulic medium under pressure. Said opening 274 is also connected by a conduit indicated in Fig. 13 under numeral 274b, to the one opening 218 which is not plugged.

Four of the openings 218 may be plugged and only one of them is connected to the conduit 274a. However, hydraulic medium under pressure will then be supplied to the through opening 215 so as to be available to all bushings 250. Opening 274 of block 273 is connected by conduit 275a to opening 111 (see Fig. 1) to supply hydraulic medium to chamber 108 for actuating clutch 102. Opening 276 is conected by conduit 276a to the cylinder 178 which actuates the brake 161. Opening 277 is connected by tube 277a to the cylinder 137 for actuating the small brake 131. Opening 278 is connected by tube 278a through tube 40 to the chamber 39 for supplying pressure for actuating clutch 67.

Within the chamber 206 there may be attached in any suitable manner six similar shuttle valves 280. Each shuttle valve 280 comprises a through passage 281 formed with a pair of valve seats 282. It is also formed with a central passage 283 which connects to the middle of the through passage 281. Within passage 281 is a ball 284.

If hydraulic pressure is supplied to either end of the passage 281, the opposite end of said passage is closed by a ball 284 and the liquid will pass out through the central passage 283. Thus each of the six shuttle valves has three openings. These openings are connected to the openings 275 to 278 inclusive and to the openings 214 in the following manner:

The topmost opening 214 will be designated by letter S, indicating "Stop"; the next opening 214 therebelow will be designated by the letter H to indicate "High"; the next lower one by letter M to indicate "Medium"; the next lower one by the letter L to indicate "Low," and the lowermost one by the letter R to indicate "Reverse."

The six shuttle valves 280 will be indicated by the numerals 280a, 280b, 280c, 280d, 280e, and 280f, respectively. The opening 278 is connected by tube 285 to the central passage 283 of shuttle valve 280a. Adjacent ends of the through passages of shuttle valves 280a and 280b are interconnected by conduit or tube 286; the adjacent ends of shuttle valves 280b and 280c by tube or conduit 287. The other end of the through passage of shuttle valve 280c is connected by tube 288 to opening R. Said opening R is connected by tube 289 to one end of the through passage in shuttle valve 280d. The other end of the through shuttle valve 280d is connected by conduit or tube 290 to one end of the through passage of the shuttle valve 280e. The other end of the through passage of shuttle valve 280e is connected by tube or conduit 291 to one end of the through passage in shuttle valve 280f. The other end of the through passage in valve 280f is connected by conduit 292 to the central passage of valve 280c. The opposite end of through passage in valve 280a is connected by conduit 293 to the central passage 283 of valve 280e, conduit 286 is connected by conduit 294 to opening M. Conduit 287 is connected by conduit 295 to opening L. The central passage of valve 284b is connected by conduit 296 to opening 276 in block 273. The central passage of valve 280d is connected by conduit 297 to opening 277 in block 273. Conduit 290 is connected by conduit 298 to opening S. Conduit 291 is connected by conduit 303 to opening H. The central passage of valve 280f is connected by conduit 299 to opening 275 in block 273.

For the purpose of clarity, the topmost piston will be designated by numeral 253S indicated "Stop"; the next piston lower down will be indicated by numeral 253H indicating "High speed"; the next lower piston will be indicated by the numeral 253M indicated "Medium speed"; the next lower piston will be designated by numeral 253L indicating "Low speed" and the lowermost piston will be designated by numeral 253R indicating "Reverse."

When any piston is moved or pushed inwardly or actuated, the opening 214 associated therewith is connected to hydraulic medium under pressure. When any piston is moved outwardly or released pressure is cut off from the opening 214 associated therewith. When the topmost piston is pushed inwardly to the position shown in Figs. 9 and 13, the spindle 43 will be stopped. This is true because hydraulic medium under pressure will then be passed to opening S through conduit 298, through shuttle valve 280e, through conduit 293, shuttle valve 280a, opening 278 and tube 40 to actuate clutch 67. At the same time hydraulic medium under pressure will pass from conduit 298 to shuttle valve 280d, conduit 297, opening 277 and tube 277a to actuate the small brake 131 for braking the rotation of the carrier 46. When the small brake 131 and the clutch 67 are actuated, rotation of the spindle 43 will be stopped or braked as explained hereinabove.

Now let us consider what happens when piston 253H is pushed in. When that is done, piston 253S will be pulled out or released by the sprocket chain 233 since only one piston can be pushed in at a time, and there is only enough slack in the sprocket chain to permit only one piston to be pushed in at a time. When piston 253S is released, actuation of small brake 131 is released. However clutch 67 will be actuated in the following manner: When piston 253H is pushed in, opening H is subjected to hydraulic medium under pressure. The pressure will be transmitted through conduit 298, through shuttle valve 280e, through conduit 293, shuttle valve 280a, again to opening 278, and tube 40, to actuate said clutch 67. At the same time, pressure is transmitted from conduit 303 to shuttle valve 280f to conduit 299, to opening 275, and tube 275a to actuate clutch 102. When the two clutches 67 and 102 are actuated, the spindle will rotate at high speed, as explained hereinabove.

When the third piston 253M is pushed in, piston 253H is released to release clutch 102. Such action will subject opening M to hydraulic medium under pressure. The pressure is transmitted through conduit 294, to shuttle valve 280, conduit 285, to tube 40, for actuating clutch 67. Also pressure is transmitted from conduit 274, to shuttle valve 280b, conduit 296, to opening 276, and tube 276a, for actuating the large brake 161. When actuating the large brake 161 simultaneously with clutch 67 the spindle will be rotated at medium speed, as explained hereinabove. When the fourth piston 253L is pushed in, piston 253M will be released to release clutch 67. Such action will subject opening L to hydraulic medium under pressure which will be supplied to conduit 295, shuttle valve 280b, conduit 296 and tube 276a, to actuate the large brake 161. At the same time, pressure will be passed through shuttle valve 280c, conduit 292, shuttle valve 280f, conduit 299 and tube 275a to actuate clutch 102. When the large brake 161 and clutch 102 are actuated the spindle will be rotated in low speed range, as explained hereinabove.

When lowermost piston 253R is pushed in, opening R is subjected to hydraulic medium under pressure transmitted by conduit 288 to shuttle valve 280c, conduit 292, shuttle valve 280f, conduit 299 to tube 275a, for actuating clutch 102. At the same time, hydraulic medium under pressure passes through opening R to conduit 289, shuttle valve 280d, conduit 297 and tube 277a, for actuating the small brake 131. When clutch 102 and the brake 131 are simultaneously actuated, the spindle is rotated in reverse direction, as explained hereinabove.

When all five pistons are pulled out or released, no pressure is imposed on any of the openings, which means that both brakes and both clutches are in released condition. The drive shaft will then rotate freely and the spindle will idle so that it can be rotated by hand.

It will be understood that in each of the ranges "High,"

"Medium," "Low" and "Reverse" variations in speed may be achieved by means of handle 300 pivoted as at 301 to the box. On handle 300 is an arm 302 which may be connected in any suitable Reeves drive (not shown). The handle 300 passes between the cover plate 224 and plate 223. The cover plate 224 terminates below the upper end of the box so that the handle may project thereabove. However, this handle is not considered to be part of this invention.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. In combination, a driven shaft, a drive shaft, a sun gear on the drive shaft, planet pinions meshing with the sun gear, a carrier for said planet pinions, a ring gear meshing with the planet pinions, said sun gear, planet pinions, and ring gear constituting a first planetary gear train, clutch means interposed between said carrier and the driven shaft, a sun gear for a second planetary gear train on said carrier, said second planetary gear train comprising planetary pinions meshing with the sun gear of said second planet gear train, a ring gear meshing with the planet pinions of the second planet gear train, means to interconnect said ring gears of the first and second planetary gear trains for rotation together, a carrier for the planet pinions of the second gear train, and clutch means interposed between the carrier of the second planetary gear train and said driven shaft.

2. The combination of claim 1, in combination with means to brake the carrier of the first planetary gear train, and means to brake said interconnected ring gears.

3. The combination of claim 2, in combination with a single manually actuated means for concurrently actuating any two of the two brake means and two clutch means.

4. The combination of claim 2 in combination with a plurality of manually actuated members, and means to cause actuation of a different selected two of the two brake means and two clutch means, upon actuating each of said manual members.

5. The combination of claim 2, in combination with a plurality of manually operated members, and means controlled by each of the manually operated members to concurrently actuate a pair of the first brake means, second brake means, first clutch means and second clutch means, the actuation of any one manual member causing actuation of a pair of said means different than the pair actuated upon operation of any other manually operated members, and means to prevent concurrent actuation of more than one of said manually actuated members.

6. A driven shaft, a drive shaft, planetary gear train means interconnecting said shafts including a pair of planetary gear trains each comprising a rotatable planet pinion carrier, a sun gear connected to one planet carrier, planet pinions on the other carrier meshing with said sun gear, planet pinions on the first carrier, a sun gear on the drive shaft meshing with the planet pinions on the first carrier, a ring gear for the planet pinions on both carriers, a pair of clutch elements each interconnecting a respective one of said carriers with the driven shaft, and a pair of brake elements for braking said first planet pinion carrier and the ring gear, respectively, and means actuating said elements.

7. The combination of claim 6, a plurality of manually operated members, and means controlled by the manual operation of each manually operated member to actuate a different selected pair of said elements.

8. The combination of claim 7, in combination with means to prevent concurrent actuation of more than one of said manually actuated members.

9. The combination of claim 7, in combination with means to prevent actuation of more than one of said manually actuated members, and means controlled by actuation of any manually actuated member to release the previously manually actuated members.

10. In combination a driven shaft, a drive shaft, a sun gear on the drive shaft constituting part of a first planetary gear train, said first planetary gear train comprising planet pinions meshing with the sun gear, a first carrier for said planet pinions, and a first sun gear meshing with said planet pinions, said first carrier being provided with a sun gear constituting part of a second planetary gear train, said second planetary gear train comprising planet pinions meshing with the second sun gear, a second carrier for said second planet pinions, a second ring gear meshing with said second planet pinions, and fixed to said first ring gear, a first clutch interposed between the first carrier with the driven shaft, a second clutch interposed between the second carrier and the driven shaft, a first brake for the first carrier, and a second brake for the interconnected ring gears.

11. The combination of claim 10, said ring gears comprising a pair of similar symmetrically disposed members having mutually contacting flanges and means to bolt said flanges together.

12. The combination of claim 10, in combination with hydraulic means to operate the first clutch, hydraulic means to operate the second clutch, hydraulic means to operate the first brake, and hydraulic means to operate the second brake.

13. The combination of claim 12 in combination with a plurality of manual members, and a hydraulic system controlled by said manual members for actuating a selected different pair of said hydraulic means upon actuating any of said manual members.

14. The combination of claim 10, in combination with five manually operated members, means to actuate the first clutch and the first brake concurrently upon actuating the first manually operated member alone, and for actuating both clutches concurrently upon actuating the second manually operated member alone, and for actuating the first clutch and second brake concurrently upon actuating the third member alone, and for actuating the second clutch and the second brake concurrently upon actuating the fourth manually operated member alone, and for actuating the second clutch and the first brake concurrently upon actuating the fifth manually operated member alone.

15. The combination of claim 14, and means to release the last operated manual member upon thereafter actuating another manually operated member.

16. The combination of claim 14, and means to release the last manual member upon thereafter actuating another manually operated member and means to prevent simultaneous actuation of more than one manually operated member.

17. A driven member, a drive member, drive means to interconnect said drive member with the driven member including planetary gearing comprising a pair of rotatable planet pinion carriers, a sun gear connected to one planet pinion carrier, pinions on the other planet pinion carrier meshing with said sun gear, planet pinions on said one planet pinion, a sun gear on the drive member meshing with said last named pinions, a pair of clutch elements interconnecting each of said carriers with said driven member, a ring gear carrier drivingly engaged with said planet pinion carriers, brake elements for braking said ring gear carrier and one of said planet pinion carriers, and means to concurrently actuate a pair of said four elements to stop rotation of said driven member, a different pair of said four elements to rotate said driven member at high speed, still a different pair of said elements to rotate said driven member at medium speed, still a different pair of elements to rotate said driven member at low speed, and still a different pair of elements to rotate said driven member in reverse direction.

18. The combination of claim 17, the arrangement being such that when all four elements are released, the driven shaft will idle so that it can be turned by hand.

19. The combination of claim 18, in combination with five manually actuated members, means controlled by the actuation of the first manually actuated element alone to actuate the pair of elements which stop the driven member, means controlled by actuation of the second manual member to actuate a pair of elements which puts the driven shaft into high speed, means controlled by actuation of the third manual member to actuate the pair of elements which puts the driven shaft into medium speed, means controlled by the actuation of the fourth manual member to actuate the pair of elements which puts the driven shaft into low speed, and means controlled by the fifth manual member to actuate the pair of elements which causes the driven shaft to be rotated in reverse direction.

20. In combination, a driven shaft, a drive shaft, a sun gear on said drive shaft, planet pinions meshing with the sun gear, a carrier for said planet pinions, means on the carrier to support said planet pinions for rotation, a fixed ring surrounding the drive shaft and disposed at one side of said planet pinions and formed with an annular groove at the side thereof facing said planet pinions, a piston ring within said annular groove, means to supply hydraulic medium under pressure to said groove for moving said piston ring axially of the drive shaft, said carrier comprising a cylindrical member extending to the other side of said planet pinions and surrounding said driven shaft, a friction clutch interposed between said cylindrical member and said driven shaft and including disks keyed to said cylindrical member alternating with disks keyed to said driven shaft, thrust means interposed between said piston ring and said friction clutch extending parallel of said drive shaft and said driven shaft and surrounding the same, including thrust pins slidably supported on said carrier for actuating the friction clutch upon supplying hydraulic medium under pressure to said groove for moving the piston ring in a direction toward said friction clutch, gear means engaging said planet pinions, and planet gear means connecting said gear means to said carrier and driven shaft.

21. The combination of claim 20, said friction clutch including an annular disk keyed to said cylindrical member and contacted by said thrust pins.

22. The combination of claim 20, said carrier including an annular flange extending toward said fixed ring and spaced from said drive shaft, a ring surrounding the drive shaft and disposed within said annular flange and formed with a plurality of notches and thrust rollers received within said notches and projecting to both sides thereof and contacted by said piston ring, and a flat annular disk interposed between said rollers and said thrust pins.

23. In combination, a drive shaft, a driven shaft coaxial therewith, a sun gear on said drive shaft, planet pinions meshing with the sun gear, a carrier for said planet pinions, a cylindrical member on said carrier and on one side of said planet, a friction clutch interposed between the cylindrical members and the driven shaft, a fixed ring surrounding the drive shaft and disposed on the opposite side of said planet pinions, said fixed ring being formed with an annular groove, at the side thereof forcing the planet pinions, a piston ring in said groove, means to supply hydraulic pressure to said groove, thrust means disposed parallel to the axis of said shafts and interposed between the piston ring and said friction clutch, for actuating said friction clutch upon movement of the piston ring when hydraulic medium under pressure is supplied to said groove, gear means engaging said planet pinions, and planetary gear means connecting said gear means to said carrier and said driven shaft.

24. The combination of claim 23, said cylindrical member being formed with an integral cylindrical portion of reduced diameter surrounding said driven shaft and carrying a sun gear, said gear means comprising planet pinions meshing with the second sun gear, a member provided with a pair of ring gears to mesh with the two sets of planet pinions, a carrier for the second set of planet pinions, an annular flange extending from the second carrier, a member keyed to the driven shaft and formed with a flange surrounding the flange of the second carrier, said connecting means comprising a friction clutch interposed between the flange of the second carrier and the flange of the member which is keyed to the driven shaft, a second fixed ring surrounding said flange of the second carrier and formed with an annular groove at one side thereof, a piston ring in the last mentioned annular groove, means to supply hydraulic medium under pressure to the second mentioned annular groove, and thrust means interposed between the second piston ring and the second friction clutch and surrounding said flange of the second carrier.

References Cited in the file of this patent

UNITED STATES PATENTS

| | | |
|---|---|---|
| 1,257,462 | Dean | Feb. 26, 1918 |
| 1,379,833 | Newton | May 31, 1921 |
| 1,607,986 | Jones et al. | Nov. 23, 1926 |
| 1,814,096 | Saki | July 14, 1931 |
| 2,220,174 | Ravigneaux | Nov. 5, 1940 |
| 2,222,813 | Hall | Nov. 26, 1940 |
| 2,251,625 | Hale | Aug. 5, 1941 |
| 2,259,729 | Burtnett | Oct. 21, 1941 |
| 2,307,285 | Mastney | Jan. 5, 1943 |
| 2,555,454 | O'Leary | June 5, 1951 |